Nov. 1, 1955   B. T. FLOWER ET AL   2,722,060
ANIMATED TRAINING AIDS
Filed Sept. 30, 1952   3 Sheets-Sheet 2
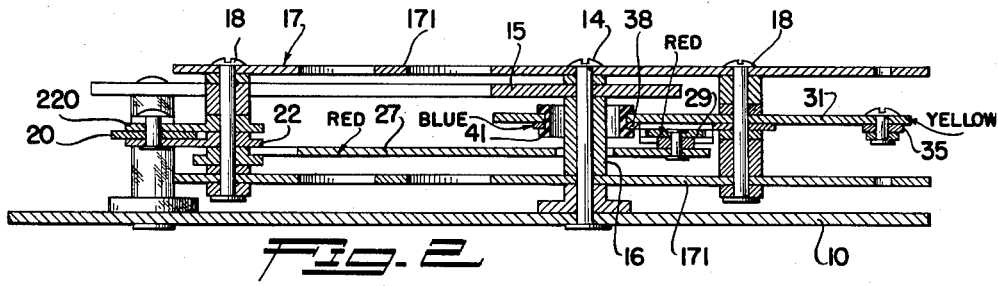
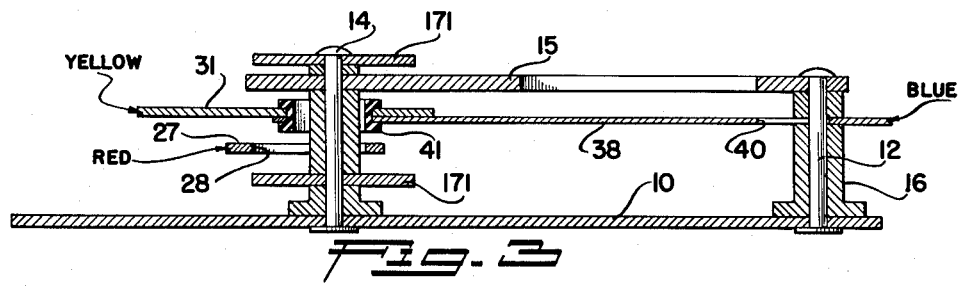
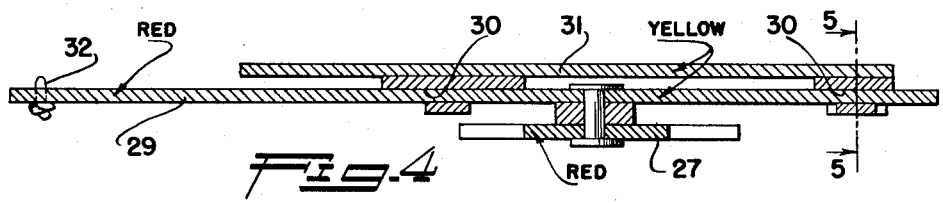
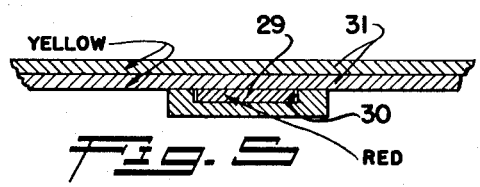
*INVENTORS*
BURTON T. FLOWER
WILLIAM Q. SULLIVAN
By *George C. Sullivan*
Agent

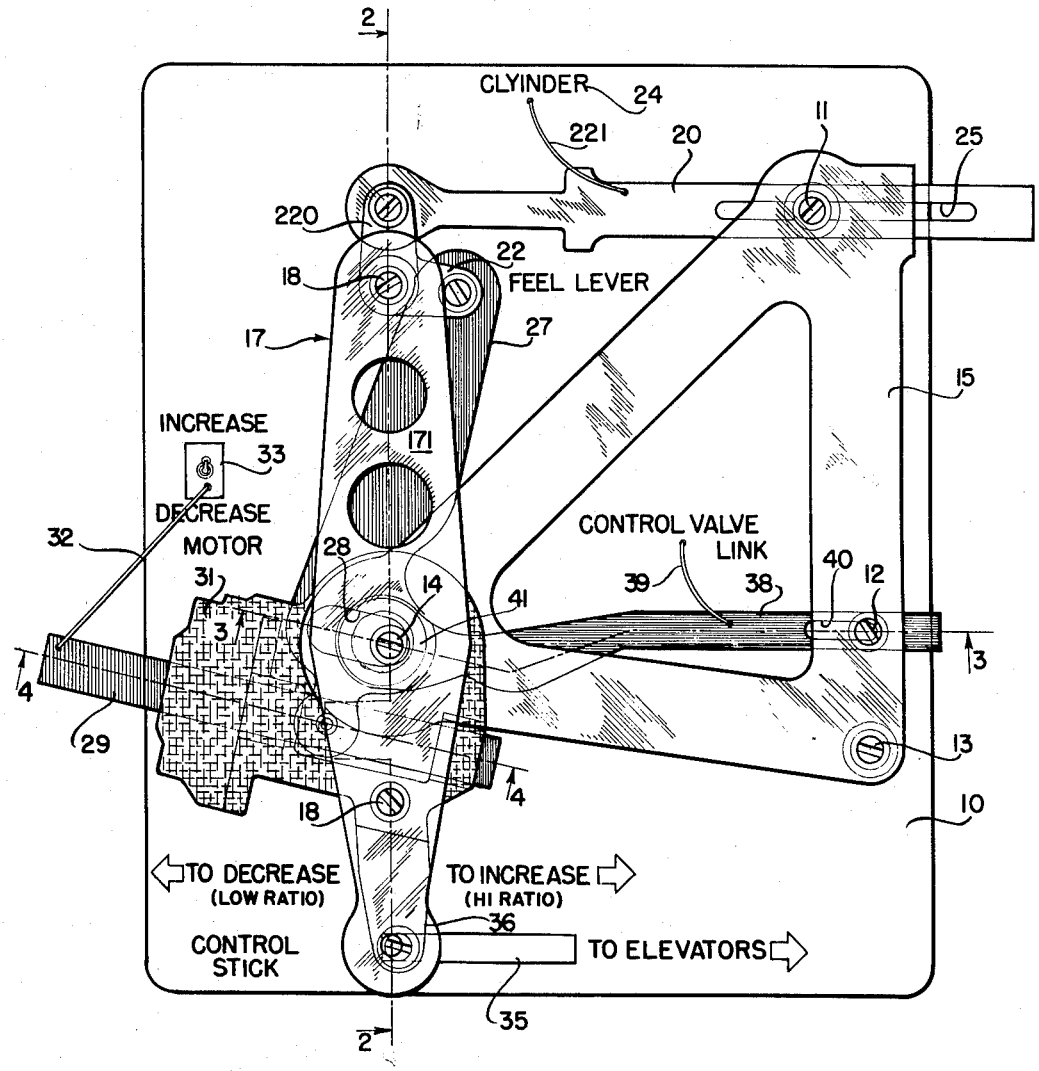

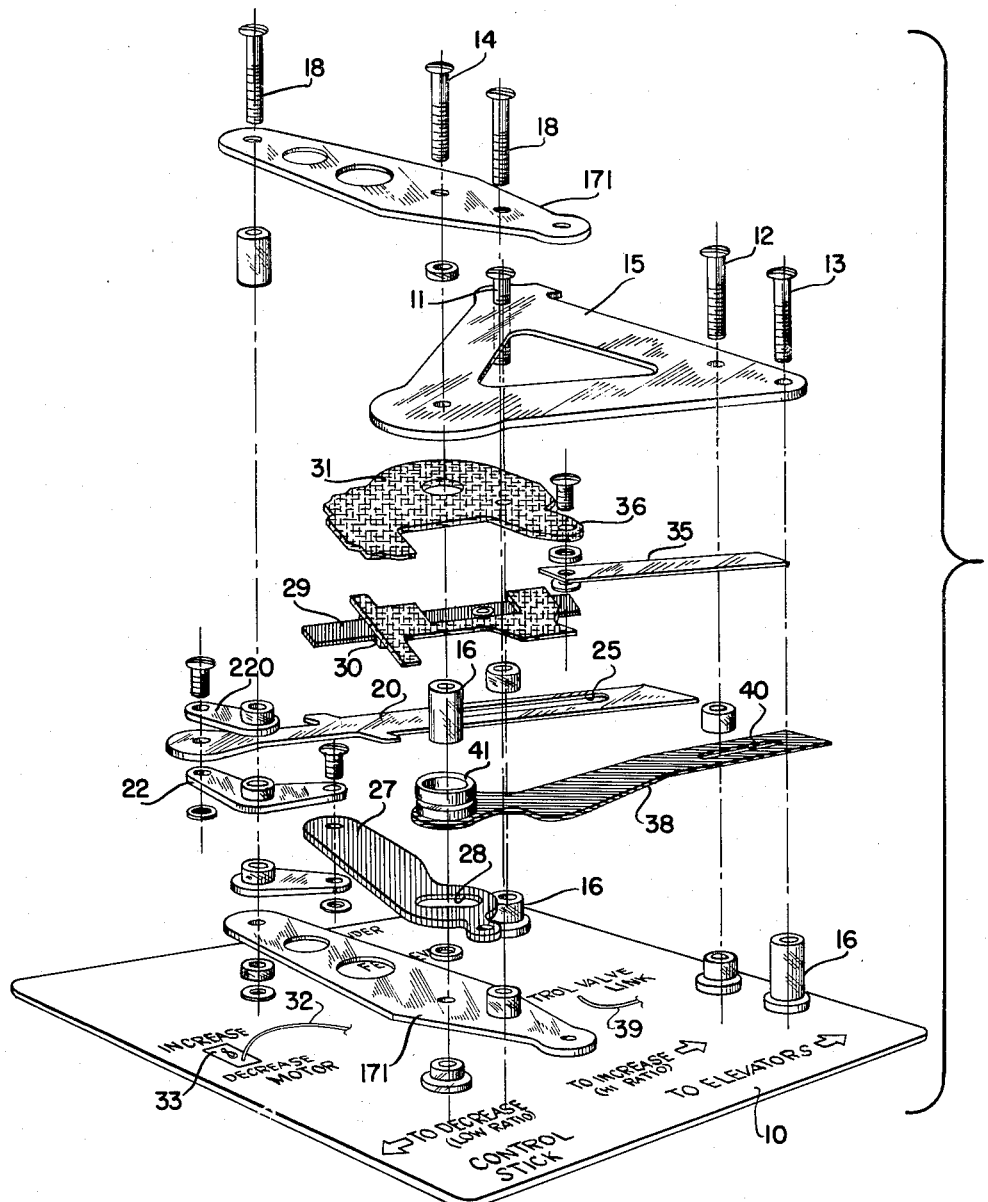

United States Patent Office 2,722,060
Patented Nov. 1, 1955

2,722,060

ANIMATED TRAINING AIDS

Burton T. Flower, Van Nuys, and William Q. Sullivan, North Hollywood, Calif., assignors to Lockheed Aircraft Corporation, Burbank, Calif.

Application September 30, 1952, Serial No. 312,300

2 Claims. (Cl. 35—13)

This invention relates to the visual presentation of the construction and operation of mechanisms of various kinds, and relates more particularly to training aids or devices for delineating or portraying the structure and mode of operation of mechanical, hydraulic and electrical mechanisms, systems, and the like.

The instruction of students, trainees, technicians, sales personnel, mechanics, etc. is materially facilitated by the employment of models, reduced scale facsimiles, cut-away units and other three-dimensional representations of the mechanisms being studied. However, where the subject mechanisms are complex in nature, embodying a plurality of relatively movable parts superimposed or positioned one within the other, such models and like representations are of little real assistance in gaining an accurate and full understanding of the mechanisms or their operations. Diagrams, prints, drawings, and photographs are of less assistance in such cases as it is usually difficult, if not impossible, for the student or trainee to comprehend or visualize from such media the true structural relationship of the various parts and components or their motions when in operation.

It is a general object of our present invention to provide animated training devices or aids that overcome the insufficiencies of the models, facsimiles, cut-away units, and other means that have previously been employed to represent mechanisms, and the like, for the purpose of instructing students, trainees, mechanics, technicians, etc.

Another object of the invention is to provide training aids of such character that each of the several components or parts of the assembly or mechanism are readily visible and the actual motions of each part as well as the relative movements of the related parts are all readily visible and understood. The construction of the aids is such that the shape and position of each part, as well as its actual functional movements and adjustments, are easily seen and understood even in the case of extremely small detailed motions and adjustments. The several parts, or at least certain of them, are constructed of transparent or translucent materials which may be of different colors, shades, surface finish and/or textures, for ready identification so that even though the parts are superimposed or positioned one within or behind the other, they are all immediately and readily recognizable and their several independent and mutual motions and adjustments are clearly visible and understood. The underlying parts, as well as certain other components, may be opaque, if desired, for the purpose of identification or to facilitate construction of the devices or aids.

Another object of the invention is to provide training aids of this nature that are such that the trainee, student, mechanic, or technician, may, himself, actuate the aid mechanism or parts thereof to observe the various components perform their respective functions and to observe the overall operation of the portrayed mechanism or device and thus readily gain an understanding of the operating principles of the mechanism and its various components.

Another object of the invention is to provide a training aid of this character that includes or employs a plate or sheet that may serve to support the other parts and that may carry drawings, diagrams, instructions, identifying indicia of the several components or parts, a description of the subject device and/or its features and mode of operation as well as the adjustments, etc. This material may be printed, drawn or produced photographically on the sheet and is usually of considerable assistance in gaining an understanding of the mechanism and its principles of operation.

It is another object of the invention to provide a training aid of this nature incorporating a novel and effective means for visually associating or connecting the movable parts, or some of them, with their respective identifying indicia, instructions, or the like, appearing on the support or backing sheet.

A further object of the invention is to provide training aids of the character described that are compact, light in weight and conveniently portable so as to facilitate handling and transporting of the devices.

A still further object of the invention is to provide training aids of this nature that are relatively inexpensive to manufacture and that may be readily duplicated or produced in volume.

Other objectives and features of the invention will become apparent from the following detailed description of a typical preferred embodiment throughout which description reference will be made to the accompanying drawings wherein:

Figure 1 is a front view or elevation of the training aid of the invention;

Figures 2, 3 and 4 are cross sectional views taken substantially as indicated by lines 2—2, 3—3 and 4—4 on Figure 1;

Figure 5 is a transverse detailed sectional view on an enlarged scale taken as indicated by line 5—5 on Figure 4; and Figure 6 is an exploded view of the training aid showing the backing or supporting sheet in a horizontal position with the various other component parts spaced thereabove.

The present invention may, of course, be designed and constructed to portray or represent various kinds of mechanisms and instrumentalities, for example mechanical, electrical, hydraulic, pneumatic, or like assemblies and devices, anatomical subjects, biological subjects, etc. as well as systems and arrangements including combinations of such mechanisms and subjects. Furthermore, the devices of the invention may be constructed in any desired or convenient scale, that is they may be of the same size as the subjects they portray or represent, they may be larger in size, or may be smaller in size than the subject mechanisms or systems. In the drawings we have illustrated a typical embodiment of the invention representing an actuating and booster mechanism for the elevators of an airplane. It should be understood that this is typical and is for the purpose of explaining the invention and is not to be construed as restricting the scope or application of our invention.

In the drawings the numeral 10 designates the mounting or supporting sheet or plate. The plate 10, which may be constructed of wood, plywood, metal, cardboard, fibreboard, plastic material, or the like, in most instances serves to mount or support the various other parts and components. As will be later described in more detail, the plate 10 also may serve to carry various legends, indicia, instructions, and, if desired, diagrams, drawings, and the like. Such written, printed or photographically produced matter may be applied directly on the face of the plate 10 or upon paper, or the like, applied to the plate. In the particular embodiment of the invention illustrated the plate 10 is generally rectangular and is flat and when in use may be positioned either vertically, horizontally, or at an angle. In the present case it will be assumed that the mounting plate 10 is in a general horizontal position.

One or more studs or posts project from the face of the plate 10 to mount and guide the other parts. In the particular embodiment of the drawings there are three stationary posts 11, 12 and 13, projecting from the plate 10 in spaced relation and adjacent one edge of the plate and a fourth post 14 which may or may not be rotatable also projects from the plate. These posts 11 to 14 inclusive, may be simple metal pins, screws, or bolts provided at their outer ends with heads to prevent displacement of the parts carried thereon. A stationary member 15 which may represent a relatively stationary or rigid part of the airplane structure, is secured or carried by the posts. This member 15 which is substantially triangular in outline, is one of the outermost elements of the assembly and for this reason is preferably constructed of transparent material so that it does not obstruct the view of the underlying parts. The member 15 as well as the other transparent, translucent and semi-transparent parts and elements of the assembly is preferably constructed of sheet stock plastic such as "Lucite" of sufficient thickness and strength to withstand the usage to which they may be subjected. As shown in Figure 1 where the colors of certain parts is indicated, the member 15 is clear or colorless. The stationary member 15 is supported in spaced generally parallel relation to the mounting plate 10 by suitable sleeves 16 on the posts 11 to 14 inclusive, which sleeves may be of transparent tubular plastic.

A lever 17 is pivoted on the post 14 and comprises two like or identical spaced parallel leaves 171. The lever 17 straddles the fixed member 15 having one leaf 171 in spaced adjacent relation to the surface of the plate 10 and having the other leaf 171 lying above and adjacent the stationary member 15. The two leaves of the lever 17 are connected to move as a unit by screws or pins 18. The lever leaves 171 are preferably constructed of a transparent material and may be without color. An elongate member 20 of sheet plastic, or other suitable material, is operatively connected with one arm of the lever 17 by a bell crank 22 which is preferably formed of transparent plastic or the like. The bell crank 22 is pivoted on one of the pins 18 of the lever 17. The elongate member 20 is intended to represent an actuating fluid pressure cylinder and has a shape or outline corresponding with such a cylinder and may either be made of sheet stock or tubular plastic stock. The word "Cylinder" 24 to designate this member 20 is printed or otherwise provided on the plate 10 and an elongate flexible element 221 is attached to the cylinder member 20 to extend to the surface of the plate 10 where it is anchored at the word "Cylinder" 24 to form a permanent line of designation extending from the word to the part or member 20 which is designated thereby. The flexible element 221 may be a length of rubber band anchored in openings in the plate 10 and cylinder member 20 and arranged to be loose or slack when the member 20 is in an intermediate position and of sufficient length to allow unrestrained axial movement of the member throughout its stroke. The cylinder member 20 has an axial slot 25 receiving the pin 11 so as to be guided for axial movement and one arm of the bell crank 22 may have a second leaf 220 so as to straddle the cylinder member to assist in restraining and guiding the same.

A member 27, having the shape or outline of a lever, is pivotally connected at one end with the bell crank 22 and is provided adjacent its other end with an elongate or arcuate slot 28. This slot 28 freely receives the pin 14 so that the member 27 is free to pivot on and with the bell crank 22. The member 27 lies between the leaves 171 of the lever 17 and is adjacent the lower or inner leaf. This lever member 27 is movable relative to the lever 17 and in order to better visually illustrate its motion and actions the member 27 has a distinctive surface, finish, texture or color. In the case illustrated the member 27 is colored red and may be constructed of a red partially transparent plastic sheet material. This colored lever member 27 is readily visible through the upper transparent leaf 171. The actuating or adjusting element for the lever 27 is in the nature of an elongate part 29 pivotally connected with the member adjacent its slot 28. Because the lever member 27 and its adjusting part 29 move as a unit and constitute a sub-assembly or sub-mechanism, they are preferably both of the same color, both being red in the present illustrative example. The colored part 29 is slidably guided for axial movement in spaced tunnels 30 provided on the underside of an element 31 which, in turn, is pivoted on a pin 18 of the lever 17. The tunnels 30 are readily provided by cementing together sections or pieces of the sheet plastic stock of which the element 31 is constructed.

Because the element 31 constitutes another sub-instrumentality of the portrayed mechanism, it is preferably of a distinctive color, finish, material or texture and has the shape or outline of the part which it represents. Thus in the drawings, the element 31 is colored yellow and, in practice, may be formed of a yellow transparent sheet plastic stock. The darker red part 29 is readily visible through the overlying portions of the lighter transparent yellow element 31, the leaf 171 and the stationary member 15, and the relative positions of the part 29, the element 31 and the lever 17 are at all times easily determined by simple visual observation. The part 29 has one end protruding beyond the element 31 and a flexible element 32, such as a string or rubber band, extends from this end to the illustration 33 of a switch provided on the face of the plate 10. The flexible element 32 has its ends anchored at the part 29 and at the plate 10 adjacent the switch illustration 33. The words "Increase" and "Decrease" are printed or otherwise provided on the plate 10 above and below the switch illustration 33 to designate the increase and decrease in boost ratio obtained by moving the switch handle to its upper and lower positions respectively.

An elongate member 35 is pivotally connected with an arm 36 on the element 31 and extends therefrom. The member 35 may represent the connection with the manually operable control stick and the legend "Control stick" may be provided on the face of the mounting plate 10 adjacent the member. A second elongate member 38 is connected with the element 31. This member 38 is designated "Control Valve Link" by a legend on the face of the plate 10 and a flexible element 39 similar to the elements 32 and 22, above described, extends between the legend and the member. The outer portion of the member 38 has a slot 40 slidably receiving the post 12 to be guided thereby. The inner portion of the member 38 overlies a part of the element 31 and a large opening provided with a bushing 41 passes through the overlapping parts. The bushing 41 serves to connect the element 31 and the link member 38. The bushing 41 also receives or passes the post 14 and its sleeve 16 with considerable clearance, thus allowing bodily movement of the element 31 and member 38. As shown in Figure 1, the link member 38 is of a distinctive, easily recognizable color, in the case illustrated being formed of blue plastic sheet stock. Thus the lever member 27, the element 31 and the link member 38, which are related for relative movement and yet which are superimposed in part, are given different colors or are constructed of materials having different distinctive colors so that their respective positions, their individual and relative motions and their adjustments can be easily discerned. In this connection it is to be understood that where we have described certain parts as constructed of colored material and/or as being colored, it is usually preferred that such parts also be transparent or partially transparent so that the surface of the plate 10 and the other instrumentalities and parts behind such transparent or partially transparent elements may be at all times seen and observed.

The present invention is not concerned with the mode of operation of the mechanism which the training aid represents or portrays and we will, therefore, not describe such operation. In employing the training aid the instructor may effectively point out the several parts and elements of the portrayed mechanism, being assisted by the markings, legends and instructions appearing on the face of the plate 10. The movable parts or elements may be easily moved at will by the instructor and the several positions, motions and adjustments thereof are all clearly discernible by the instructor as well as by the trainees, students, technicians or mechanics, and may be studied and considered in detail. The device is such that an individual student, technician, mechanic, or the like, may, himself, operate, move and adjust the movable parts to gain a full understanding of their modes of operation, their motions and adjustments and the cooperative action of the several components. The movable parts and sub-elements or components being constructed of materials of different distinctive colors and yet being transparent are all easily recognizable in their various positions and when in motion and the aid may be constructed so that none of the essential or characteristic parts or actions are concealed from view. The device may be produced in a compact, light-weight form for easy transportation and handling and for effective classroom use, shop use, etc.

Having described only typical forms of the invention we do not wish to be limited to the specific details herein set forth, but wish to reserve to ourselves any variations or modifications that may appear to those skilled in the art and fall within the scope of the following claims.

We claim:

1. A training aid for illustrating a mechanism and the operation of its component elements comprising a supporting plate, a plurality of members having marginal edges corresponding generally with the shapes of said elements, means for supporting certain of the members for individual movements corresponding generally with the movements of said elements, the members being superimposed at least in part, the members being of identifying colors and the superimposed members being constructed of transparent material, identifying indicia on the plate, and flexible elements anchored at their ends to the plate adjacent said indicia and secured to the members identified thereby to visually connect the indicia and their respective members.

2. A training aid for illustrating a mechanism and the operation of its component elements comprising a supporting plate, a plurality of members having marginal edges corresponding generally with the shapes of said elements, means for supporting certain of the members for individual movements corresponding generally with the movements of said elements, the members being superimposed at least in part, the members being of identifying colors and the superimposed members being constructed of transparent material, an illustration of an element of said mechanism on the plate, and a flexible member connecting said illustration with one of said members to represent a functional relationship between two component elements of the mechanism.

References Cited in the file of this patent

UNITED STATES PATENTS

| | | |
|---|---|---|
| 663,236 | Lofy | Dec. 4, 1900 |
| 718,193 | Colvin | Jan. 13, 1903 |
| 1,925,040 | Lindberg | Aug. 29, 1933 |
| 2,245,110 | Marcaccio | June 10, 1941 |
| 2,314,790 | Jenter | Mar. 23, 1943 |